(12) United States Patent
Takaki et al.

(10) Patent No.: US 6,307,650 B1
(45) Date of Patent: Oct. 23, 2001

(54) IMAGE READING APPARATUS

(75) Inventors: Kosuke Takaki, Dazaifu; Takeshi Nakayama, Fukuoka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/182,666

(22) Filed: Oct. 30, 1998

(30) Foreign Application Priority Data

Oct. 31, 1997 (JP) .................................................. 9-300128

(51) Int. Cl.[7] ...................................................... H04N 1/04
(52) U.S. Cl. .......................... 358/498; 358/488; 358/496
(58) Field of Search .................................. 358/498, 496, 358/486, 488, 1.1; 399/367

(56) References Cited

U.S. PATENT DOCUMENTS 5,515,150 * 5/1996 Yoshie et al. ......................... 399/367
5,583,662 * 12/1996 Takahashi et al. .................... 358/474
6,151,129 * 11/2000 Takaski et al. ........................ 358/1.1

FOREIGN PATENT DOCUMENTS 5-8930   1/1993 (JP) .
9-40305  2/1997 (JP) .

* cited by examiner

Primary Examiner—Cheukfan Lee
(74) Attorney, Agent, or Firm—Wenderoth, Lind & Ponack L.L.P.

(57) ABSTRACT

An image reading apparatus is activated when continuous documents are stacked on a table so that the table is raised. The table stops being raised when the upper most sheet of the documents contacts a pick-up roller. After the pick-up roller is driven and starts sending out the documents, the documents are transmitted to a discharging outlet after undergoing a readout process. When the document arrives at a given location in the apparatus, the table is lowered so that the continuous documents can avoid being damaged.

3 Claims, 10 Drawing Sheets

IMAGE READING APPARATUS

FIELD OF THE INVENTION

The present invention relates to an image reading apparatus for handling continuous documents.

BACKGROUND OF THE INVENTION

The prevalence of the electronic filing system has increased the need for image reading apparatuses as input means. The electronic filing system used for office work, among other uses, is demanded to have higher speed processing in order to improve work efficiency. Main stream process methods of electronic filing systems process documents as follows: sheets of a document are sent out sequentially from a document feeding table, and each sheet of the document is transmitted at a high speed to a fixed image reader. The Model No. KX-SS55N, a product manufactured by Matsushita Electric Industrial Co. Ltd., is an example embodying this process.

In this image reading apparatus, an upper most document of plural documents stacked on the document feeding table must be sent out sheet by sheet without the sheets being overlapped. For this purpose, a document to be sent out is pressed by a pick-up roller with a given pressure, and the roller spins to send out the document. Further, a mechanism such as a retarding roller is provided in order to avoid feeding plural documents simultaneously in error.

When such a higher speed image reading apparatus is commercialized in the market, an apparatus that can handle various types of documents, such as a compound document (e.g. duplicated document made of impact papers), card, and continuous documents, is required, as well as having the further higher speed which is demanded.

However, when continuous documents are sent out from the document feeding table, the pick-up roller sometimes damages the continuous documents due to excessive pressure applied to seams of the documents.

The present invention addresses this problem and aims to provide an image reading apparatus that can handle continuous documents without damaging them.

SUMMARY OF THE INVENTION

An image reading apparatus of the present invention comprises the following elements: (a) a table on which documents are stacked; a pick-up roller that sends out an upper most document of documents stacked on the table; table moving means for raising the table in order to bring contact between the pick-up roller and a document on the table as well as lowering the table in order to release the contact; document transmitting means for transmitting the document sent out by the pick-up roller; and reading means for reading the document sent out by the pick-up roller and outputting resultant data as image data.

The image reading apparatus having the above elements operates as follows. First, the pick-up roller sends out documents sequentially. Secondly, the document transmitting means transmits the documents. Thirdly, the reading means reads the document, and then the document arrives at a given location in the apparatus. Finally, the table is lowered.

This structure allows the continuous documents to be free from being damaged in that an appropriate space between the continuous documents on the table and the pick-up roller is provided since the table is lowered when the document arrives at the given location.

DESCRIPTION OF THE PREFERRED EMBODIMENTS

An exemplary embodiment of the present invention is described hereinafter with reference to the accompanying drawings.

Figure 1:
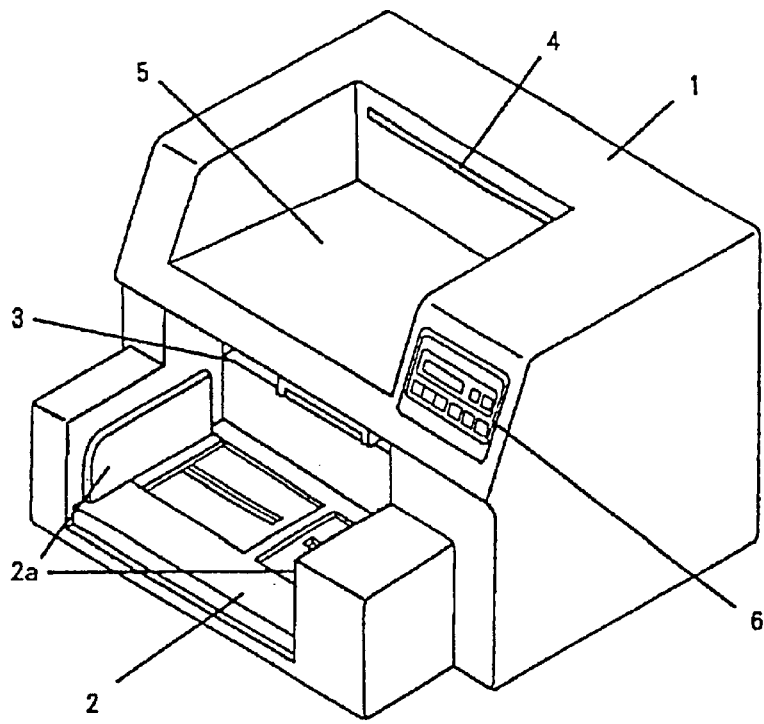
FIG. 1 is a perspective view of an image reading apparatus used in an exemplary embodiment of the present invention.
Figure 2:
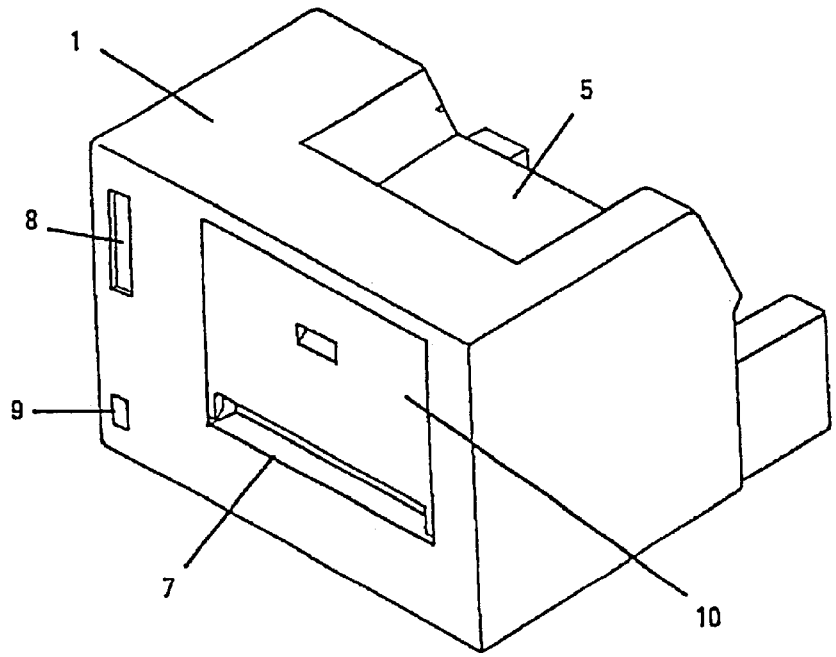
FIG. 2 is a perspective view taken from the rear side of the image reading apparatus.

FIG. 1 is a perspective view of an image reading apparatus used in an exemplary embodiment of the present invention, and FIG. 2 is a perspective view taken from the rear side of the image reading apparatus.

A hopper table 2 is mounted movably up and down to the front face of a housing 1 of the image reading apparatus. Documents stacked on the hopper table 2 are sent out into the housing 1 through a document feeding slit 3. The document fed into the housing 1 is discharged from a document discharging slit 4, then stacked on a discharged document stacker 5. An input section 6 inputs commands or sets conditions to the image reading apparatus. The hopper table 2 can be raised or lowered by a motor and an elevating mechanism (not shown). A document guide 2a disposed on the upper face of hopper table 2 can be slid in a width direction of the document. Another document discharging slit 7 is provided on a rear face of housing 1. An interface 8 (hereinafter called I/F) couples this image reading apparatus with an outer host computer. A connector 9 receives a power cord, and a door 10 is opened for maintenance work inside the housing 1.

The image reading apparatus used in this embodiment switches a transmission path inside the housing 1 responsive to a thickness or a type of document fed from the document feeding slit 3 to either the slit 4 or slit 7 for discharging the document.

The inside structure of housing 1 in this image reading apparatus is detailed with reference to FIGS. 3 and 4.

Figure 3:
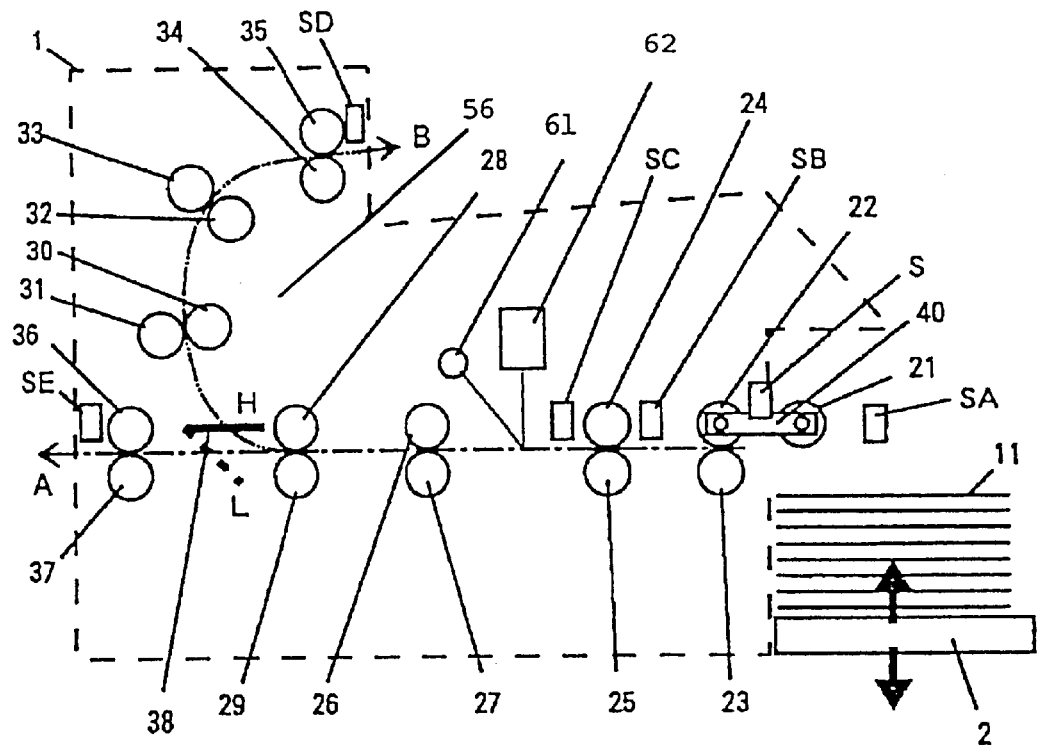
FIG. 3 is a cross-sectional view illustrating a rough structure of the image reading apparatus.

In FIG. 3, a pick-up roller 21 spins in a direction of feeding an upper most document of documents 11 stacked on the hopper table 2 into the document feeding slit 3. A document feeding roller 22 spins in a direction of feeding the document 11 from the document feeding slit 3 to the document discharging slit 7. A retarding roller 23 located under the document feeding roller 22 spins in the same direction as the roller 22 to feed the document 11 pinched between the rollers 23 and 22. At the same time, the roller 23 gives frictional force to the lower face of the document 11, thereby to prevent the document 11 from being fed in an overlapped manner.

Figure 4:
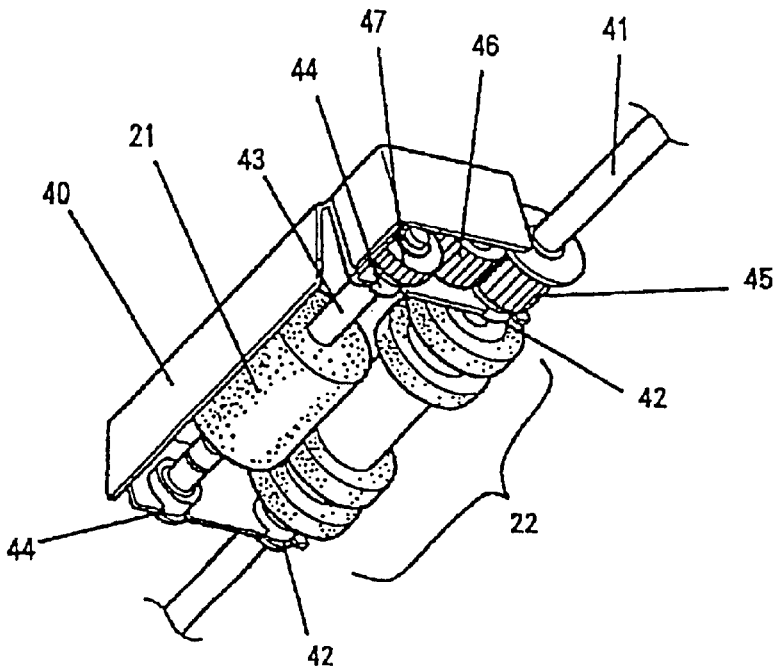
FIG. 4 is a perspective view of an enlarged pick-up roller of the image reading apparatus.

As shown in FIG. 4, a rotary shaft 43 of the pick-up roller 21 is mounted rotatably to a roller cover 40 by means of a bearing 44. A rotary shaft 41 of the document feeding roller 22 is mounted rotatably to this cover 40 by means of a bearing 42.

Accordingly, the pick-up roller 21, its shaft 43 and the roller cover 40 can be rotated on the rotary shaft 41.

Figure 5:
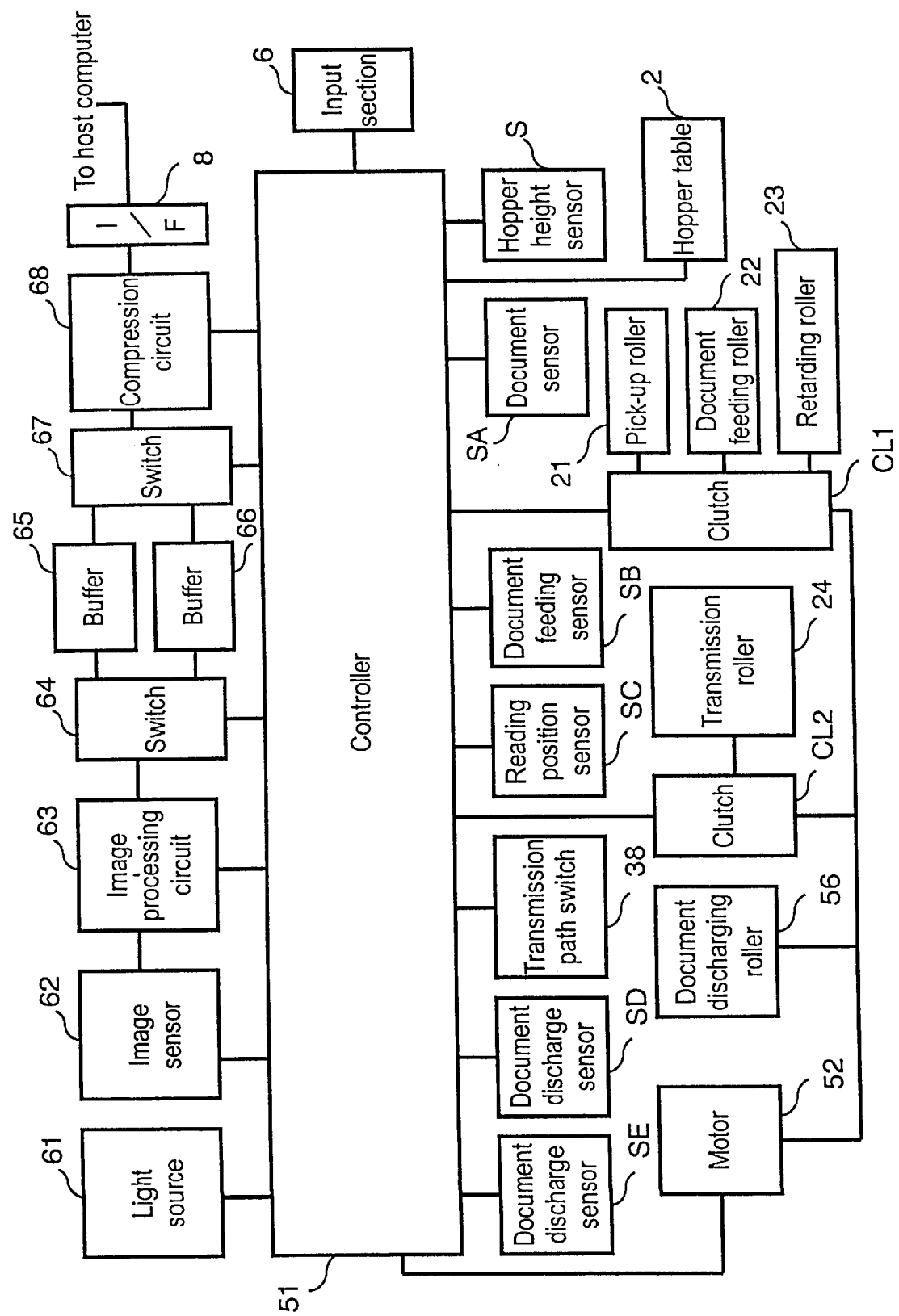
FIG. 5 is a block diagram of the image reading apparatus.

This rotary shaft 41 is coupled to a motor 52 via a clutch CL1 that is shown in FIG. 5. Further, the rotary shaft 43 of the pick-up roller 21 is coupled to the rotary shaft 41 of the document feeding roller 22 via gears 45, 46 and 47. When the motor 52 is driven with the activated clutch CL1, the pick-up roller 21 and the document feeding roller 22 spin in the same direction.

Since the pick-up roller 21 and its shaft 43 rotate on the rotary shaft 41, the pick-up roller 21 is located at a lower position than the document feeding roller 22 when the hopper table 2 is lowered.

Then, the hopper table 2 is raised to push the pick-up roller 21 by the upper most document of the documents 11 up to a height where pick-up roller 21 is approximately on the same height as the document feeding roller 22. The hopper table 2 is stopped at this height, thereby pick-up roller 21 stops being raised, and the documents 11 is fed by driving the motor 52.

Feeding the documents reduces the stacked documents 11 and lowers gradually a height of the upper most document, which accompanies the lowering of pick-up roller 21. A hopper height sensor S senses the position of the roller cover 40 thereby detecting whether the roller 21 is within a given range of heights. When the pick-up roller 21 is detected as being lowered to a lower position than the given height by the sensor S, the hopper table 2 is raised so that the pick-up roller 21 rises up to the given height.

This mechanism enables the pick-up roller 21 to feed the document 11 securely into a nipping point between the document feeding roller 22 and the retarding roller 23, whereby the document can be fed in a stable manner. A document sensor SA detects the existence of documents 11 on the raised hopper table 2.

A transmission roller 24 transmits the document 11 to the reader. A slave roller 25 is subjected to the rotation of the transmission roller 24. A document feeding sensor SB is disposed on the upstream side of the transmission roller 24, and a reading position sensor SC is disposed on the downstream side thereof.

Document discharging rollers 56 comprise document discharging rollers 26,28,30,32,34 and 36, and the rollers 56 discharge the document 11, which was already read out, through the document discharging slits 4 or 7. Slave rollers 27,29,31,33,35 and 37 are subjected to the respective document discharging rollers 26, 28, 30, 32, 34 and 36.

A transmission-path-switch 38 can be switched from a position H (shown in a solid line) to a position L (shown in a broken line) and vice versa so that a discharging direction is switched from the document discharging slit 7 located on the rear face of the housing 1 to another slit 4 on the front face thereof and vice versa. The discharging direction through the slit 4 is indicated with an arrow mark B, and the other direction through the slit 7 is indicated with an arrow mark A.

FIG. 5 is a block diagram depicting a mechanism of how to control the image reading apparatus.

In FIG. 5, a controller 51 controls an entire operation of the image reading apparatus. The motor 52 drives respective rollers that transmit the document 11, i.e., the motor 52 drives the pick-up roller 21, document feeding roller 22 and retarding roller 23 via the clutch CL1, and also drives the transmission roller 24 via the clutch CL2. In addition, the motor 52 drives the document discharging rollers 56 free from the clutches.

By activating the clutch CL1 when the motor 52 is driven, the pick-up roller 21, document feeding roller 22 and retarding roller 23 are driven, then by inactivating the clutch CL1, these rollers are released from spinning.

In the same manner, by activating the clutch CL2, the transmission roller 24 is driven, and by inactivating the clutch CL2, the roller 24 is free from spinning.

However, the document discharging rollers 56 always spin whenever the motor 56 is driven. The motor 52 employs a stepping motor, the rotational speed thereof is thus readily controlled through the setting of the controller 51.

The hopper position sensor S monitors whether the hopper table 2 is positioned at an appropriate height through sensing the height of pick-up roller 21, which has been described with reference to FIG. 3. The document sensor SA detects whether the document 11 is set on the hopper table 2. The document feeding sensor SB is disposed on the upstream side of the transmission roller 24. After a given time when this sensor SB detects the leading edge of the document 11, the controller 51 determines that the document 11 is pinched between the transmission roller 24 and its slave roller 25.

The reading position sensor SC is disposed on the downstream side of the transmission roller 24. After a given time when the sensor SC detects the leading edge of the document 11, the controller 51 starts reading by using a light source 61 and an image sensor 62. The document discharging sensor SD detects the discharged document 11 from the document discharging slit 4, and a document discharging sensor SE detects the document 11 discharged from the slit 7.

The controller 51 can switch the transmission path switch 38 from the positions H to L and vice versa. As shown in FIG. 3, the switch 38 positioned at "H" leads the document 11 to the document discharging slit 7 (indicated by the arrow mark A), and the switch at "L" leads the document 11 to the slit 4 (arrow mark B.)

An incident light from the light source 61 onto the document 11 is reflected into the image sensor 62, where the light is transformed into electric signals before being fed to a image processing circuit 63. The electric signals undergo image processes including an A/D converting process and binarization process in a circuit 63. The resultant image data are written into a buffer 65 or 66. The image data in the buffer 65 or 66 undergo a compression process in a compression circuit 68, and are supplied to the outer host computer via the I/F 8.

The buffers 65 and 66 are capable of storing uncompressed data corresponding to a sheet of the document 11.

The controller 51 can select the buffer 65 or 66, to which output data from the image processing circuit 63 is stored, and from which the data are read out and fed into the compression circuit 68, by selecting a switch 64 or 67.

When the data are written into the buffer 65 or 66, the image processing circuit 63 gives a notice thereof to the controller 51. When the data are read out from the buffer 65 or 66, compressed and supplied to the host computer, the compression circuit 68 gives a notice thereof to the controller 51. As such, the controller is always informed of the status of both the buffers, namely, which buffer is ready to be written in or read out, and which buffer has been written in or read out.

Figure 13:
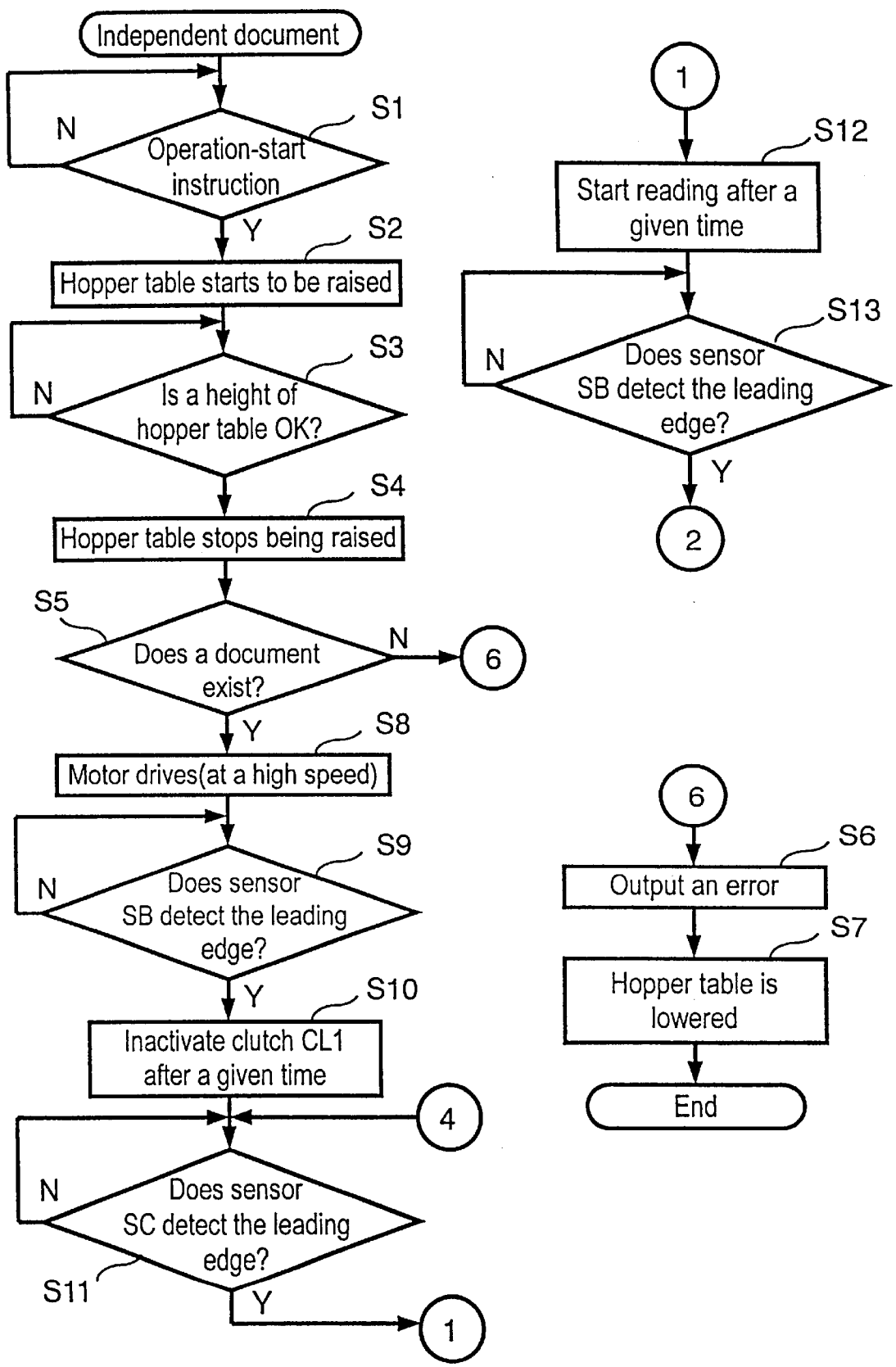
FIG. 13 is a flowchart depicting an operation when the image reading apparatus handles an independent single document.
Figure 14:
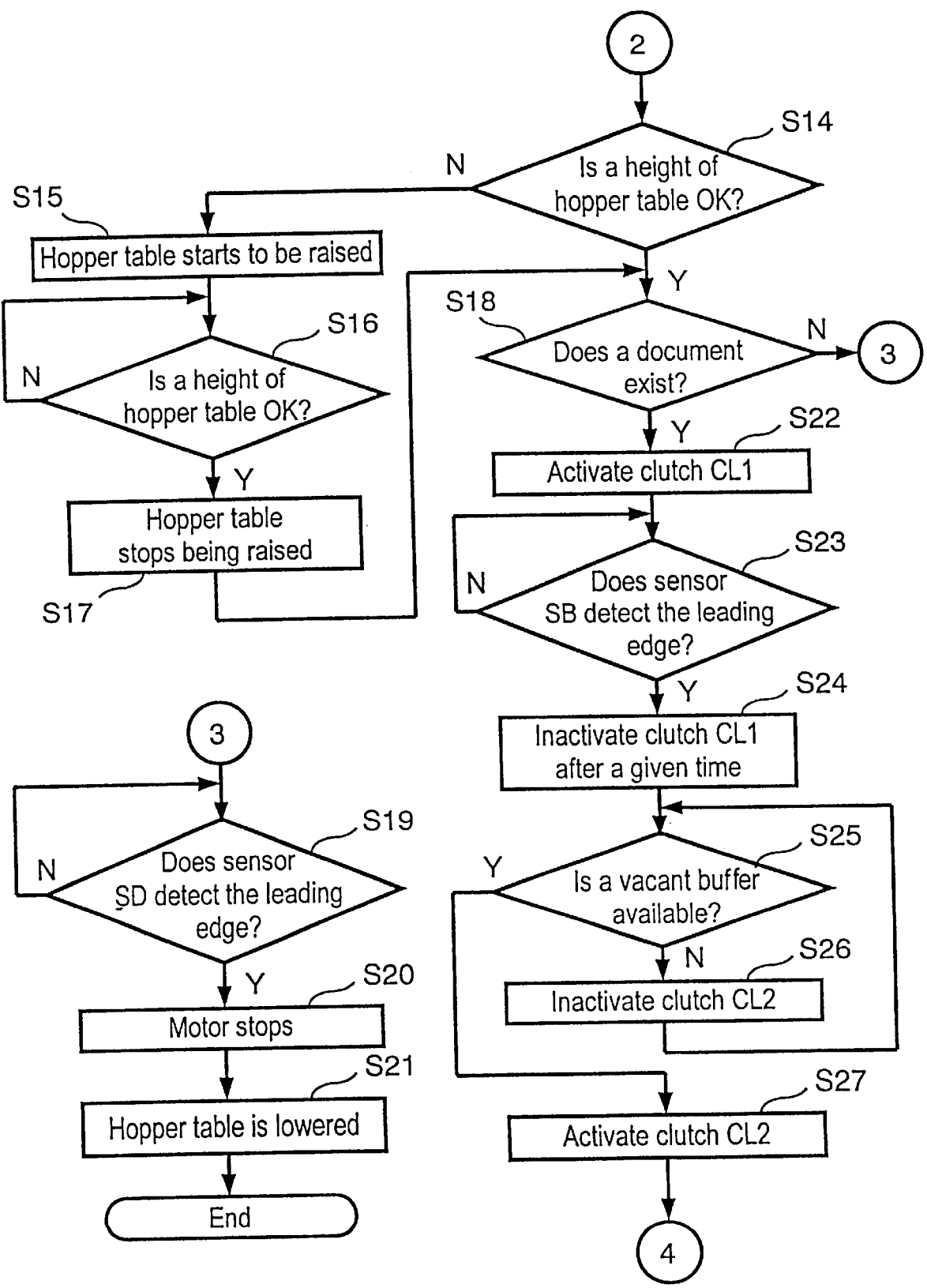
FIG. 14 is a flowchart depicting an operation when the image reading apparatus handles an independent single document.
Figure 15:
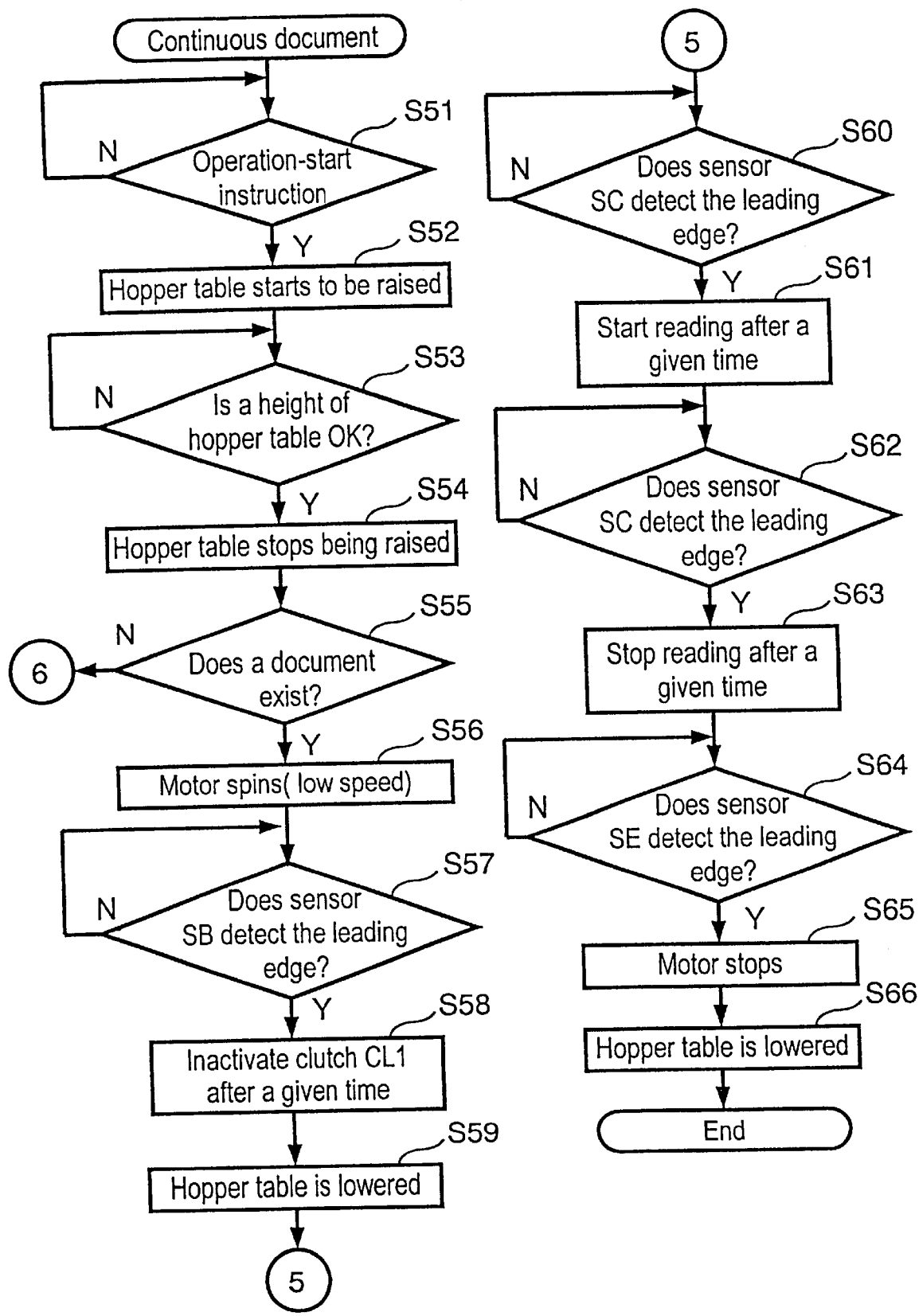
FIG. 15 is a flowchart depicting an operation when the image reading apparatus handles continuous documents.

The operation of the image reading apparatus having the above mentioned construction is described with reference to the flowcharts in FIGS. 13, 14, and 15.

When the input section 6 is set such that independent documents 11 are to be handled, the controller 51 sets the transmission switch 38 to the "L" side following the setting from the input section 6 (refer to FIG. 6–FIG. 9). The document 11 is thus supposed to be discharged through the slit 4 (along the arrow mark B.)

When the controller 51 receives a command of starting an operation from the host computer (or from the input section 6) [step 1], the hopper table 2 starts to be raised [step2]. The upper most document of the documents 11 pushes up the pick-up roller 21. When no document 11 is in the hopper table 2, the table 2 pushes up the pick-up roller 21. The hopper height sensor S detects that the table 2 reaches an appropriate height [step 3], then the table 2 stops being raised [step 4]. The document sensor SA checks whether the document 11 exists or not on the hopper table 2 [step 5].

If the document does not exist, the host computer receives an error signal indicating "no document", and a display panel in the input section 6 displays the message of, "no document"[step 6]. Then the hopper table 2 lowers [step 7].

When the document 11 is placed on the table 2, the controller 51 drives the motor 52 in a high speed mode [step 8]. Then, the pick-up roller 21, document feeding roller 22, retarding roller 23, transmission roller 24 and document discharging rollers 56 spin in unison (suppose that the clutches CL1 and CL2 are activated at an initial condition). The documents 11 on the table 2 start being fed as shown in FIG. 6.

Figure 6:
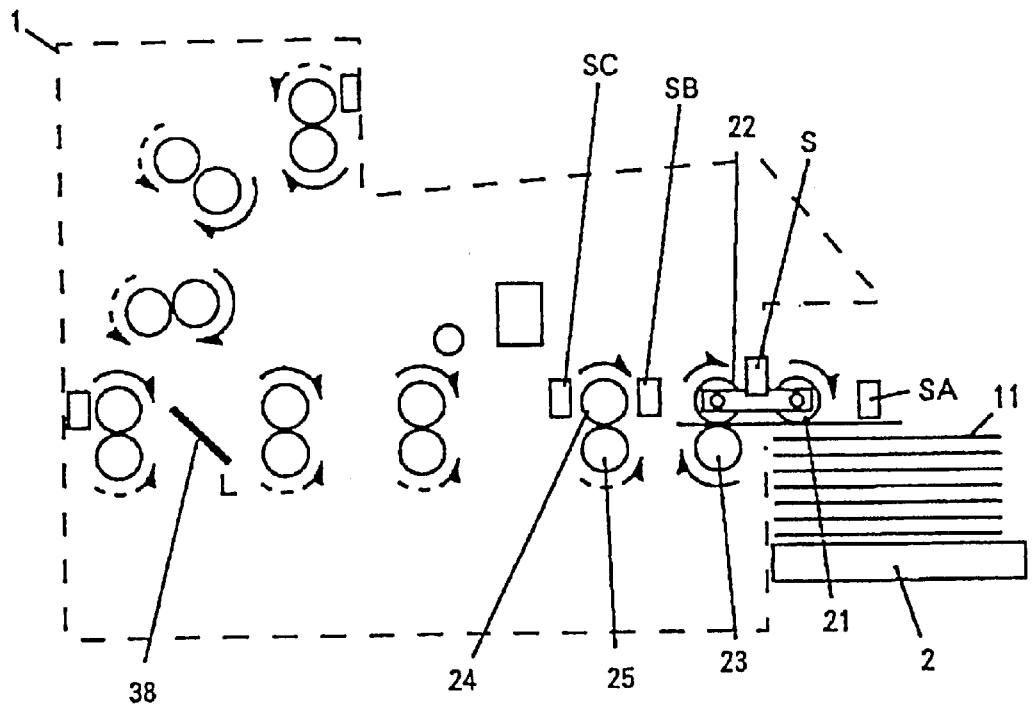
FIG. 6 illustrates an operation of the image reading apparatus.
Figure 7:
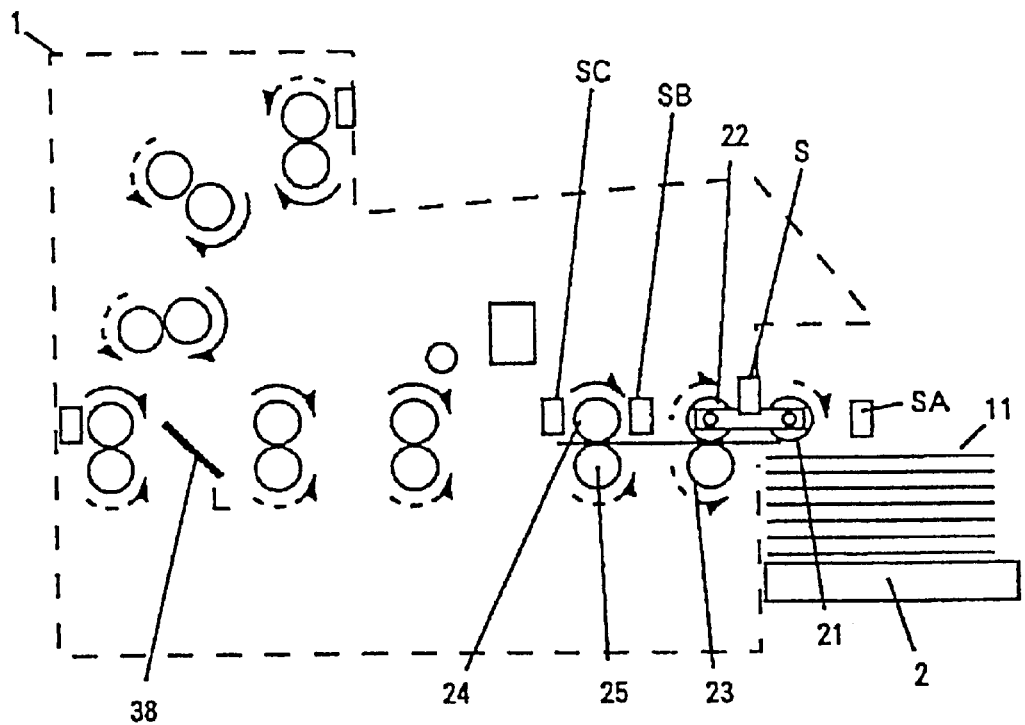
FIG. 7 illustrates an operation of the image reading apparatus.
Figure 8:
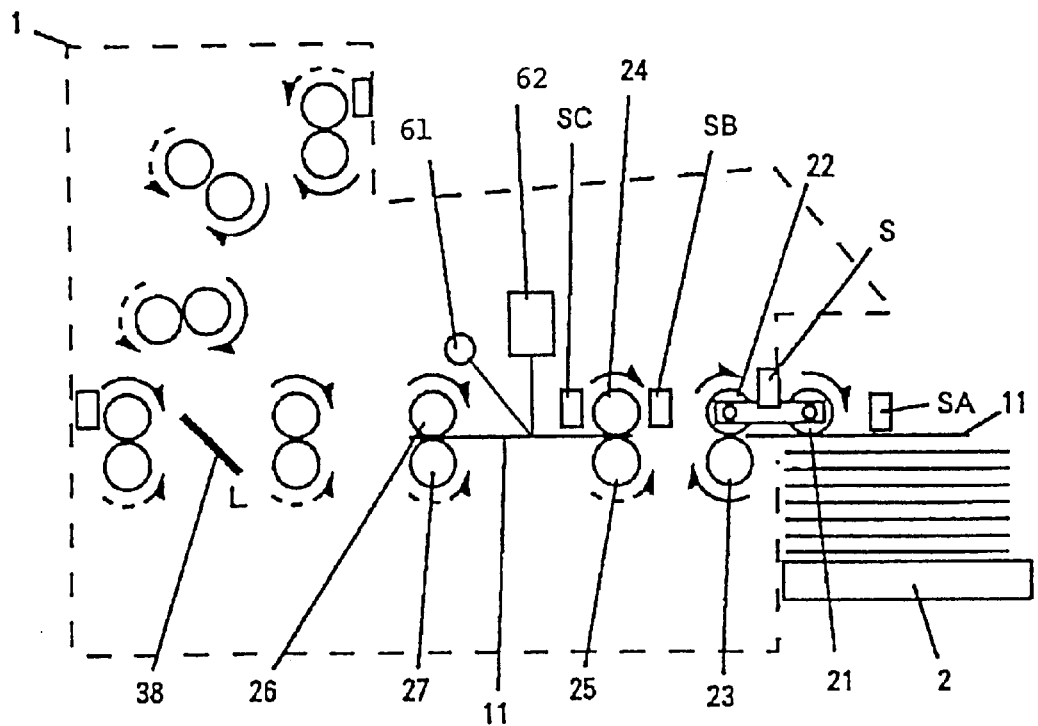
FIG. 8 illustrates an operation of the image reading apparatus.

The arrow marks in FIG. 6 indicate rotating directions of respective rollers. The solid arrow marks indicate that the rollers are driven directly, and the broken arrow marks indicate that the rollers are slave and subjected to other rollers.

When the document feeding sensor SB detects the leading edge of the document 11 [step 9] after the document feeding is started, the controller 51 inactivates the clutch CL1 at a given time [step 10]. Then, the next document 11 is halted and not fed, and the present document 11 is transmitted with the transmission roller 24 and its slave roller 25. The pick-up roller 21, document feeding roller 22 and retarding roller 23 are employed in this transmission. When the reading position sensor SC detects the leading edge of present document 11 [step 11], the light source 61, and the image sensor 62 start reading after a given time [step 12]. The resultant data are supplied to the host computer via the image processing circuit 63, compression circuit 68 and the like. When the document feeding sensor SB detects the ending edge of document 11 [step 13], the next document 11 is fed (refer to FIG. 8).

The document feeding of the second sheet and onward is described with reference to FIG. 14. The controller 51 checks the height of hopper table 2 with the hopper height sensor S [step 14]. The controller 51 determines the existence of the next document on the table 2 with the document sensor SA [step 18], then the clutch CL1 is activated [step 22] to feed the next document. At this time, if the table 2 is not at an appropriate height [step 14], the table 2 is raised to the appropriate height (refer to FIGS. 7 and 8) [step 15, 16 and 17]. If the next document does not exist on the table 2, the motor 52 is halted [step 20], and the table 2 is lowered [step 21] after the document discharge sensor SD detects the ending edge of the present document 11 [step 19].

The clutch CL1 is activated [step 22]. After the second sheet of document 11 starts to be fed, the document feeding sensor SB detects the leading edge of the second sheet of the document 11 [step 23]. Then, the clutch CL1 is inactivated after a given time [step 24].

Figure 9:
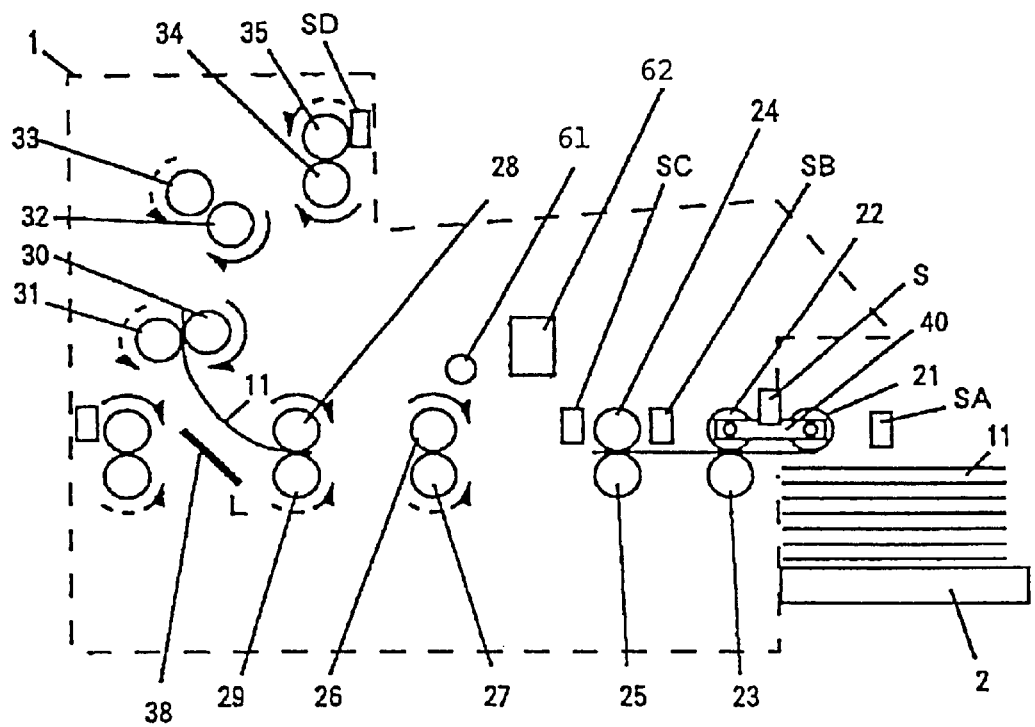
FIG. 9 illustrates an operation of the image reading apparatus.

The clutch CL2 is kept inactivated until either of the buffers 65 or 66 is ready to be written in [step 25 and step 26]. As shown in FIG. 9, the second sheet of document 11 is pinched by the document feeding roller 24 and its slave roller 25 and is halted on stand-by. When either one of the buffers 65 or 66 is ready to be written in, the clutch CL2 is activated and the second sheet of document 11 resumes being fed [step 27], then the process returns to the step 11 shown in FIG. 13.

As such, until the preceding document 11 is read out and undergoes an output process, the following document 11 is halted on stand-by just before the reader, whereby a feeding interval of the documents to be read out sequentially can be minimized. As a result, the documents can be read out at a higher speed.

The process time in the compression circuit 68 depends on a content of document 11, and even if the process time has dispersion, a transmission timing of the document can be adjusted using the standby status. Therefore, it is not necessary for the transmission speed and reading speed of document 11 to be subjected to the maximum processing time in the compression circuit 68.

Next, a case where the input section is set such that continuous documents are to be handled is described with reference to FIG. 15. The controller 51 sets the transmission path switch 38 at the "H" position according to the setting by the input section 6 (refer to FIG. 10). The document 11 is thus discharged through the slit 7 (the arrow mark A in FIG. 3), and should not be discharged in error to the discharged document stacker 5 disposed at the upper region of the housing 1.

When the controller 51 receives an operation-start-command from the host computer [step 51] (an input from the input section 6 is also acceptable), the hopper table 2 starts to be raised [step 52]. The upper most sheet of the document 11 stacked on the table 2 pushes up the pick-up roller 21 (if the document 11 does not exist on the table 2, the table 2 per se pushes up the roller 21.) The hopper height sensor S detects that the table reaches an appropriate height [step 53], then the table 2 stops being raised [step 54]. The document sensor SA checks whether the document 11 exists or not on the table 2 [step 55]. If the document does not exist, the process moves to the step 6 shown in FIG. 13, i.e. the host computer receives an error signal indicating "no document", and the display panel in the input section 6 shows the message of "no document" [step 6]. Then the table 2 is lowered [step 7].

Figure 10:
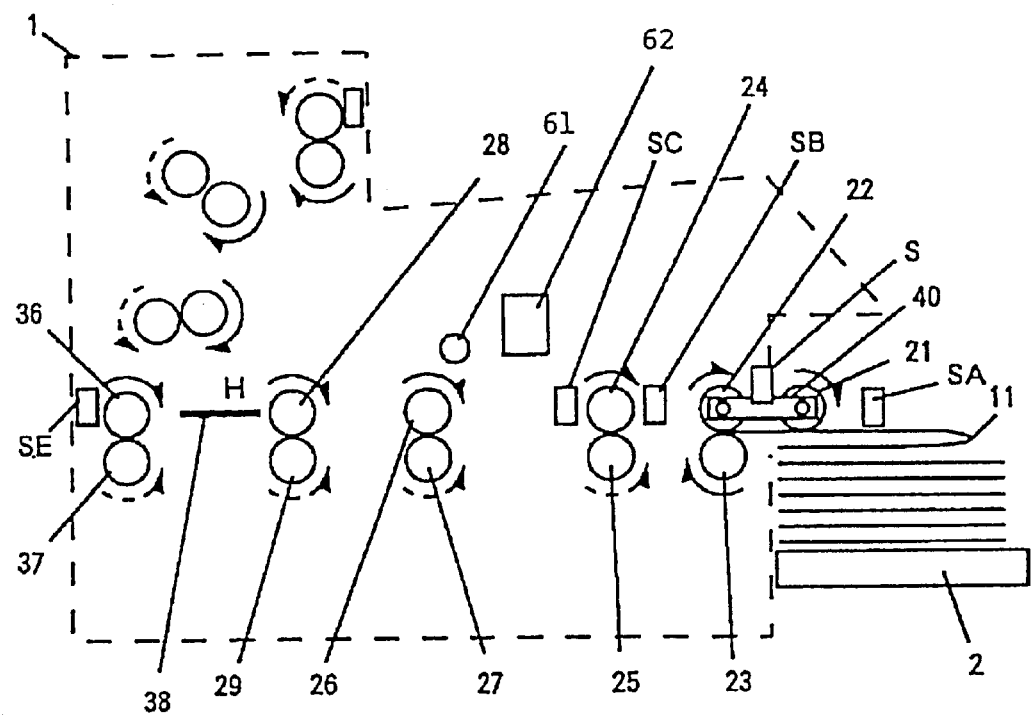
FIG. 10 illustrates an operation of the image reading apparatus.

When the document 11 exists on the table 2, the controller 51 drives the motor 52 in a low speed mode, and starts feeding the document 11 as shown in FIG. 10 [step 56]. The speed in this case is set so that the compression circuit 68 can process the data even if plural sheets are continuously read out. The stand-by status, which is provided to the independent document, is thus not necessary. Since it is difficult to provide the stand-by status if needed, due to the compressing process in the case of continuous documents, the driving speed of motor 52 should be set slower than in the case of handling independent documents.

Figure 11:
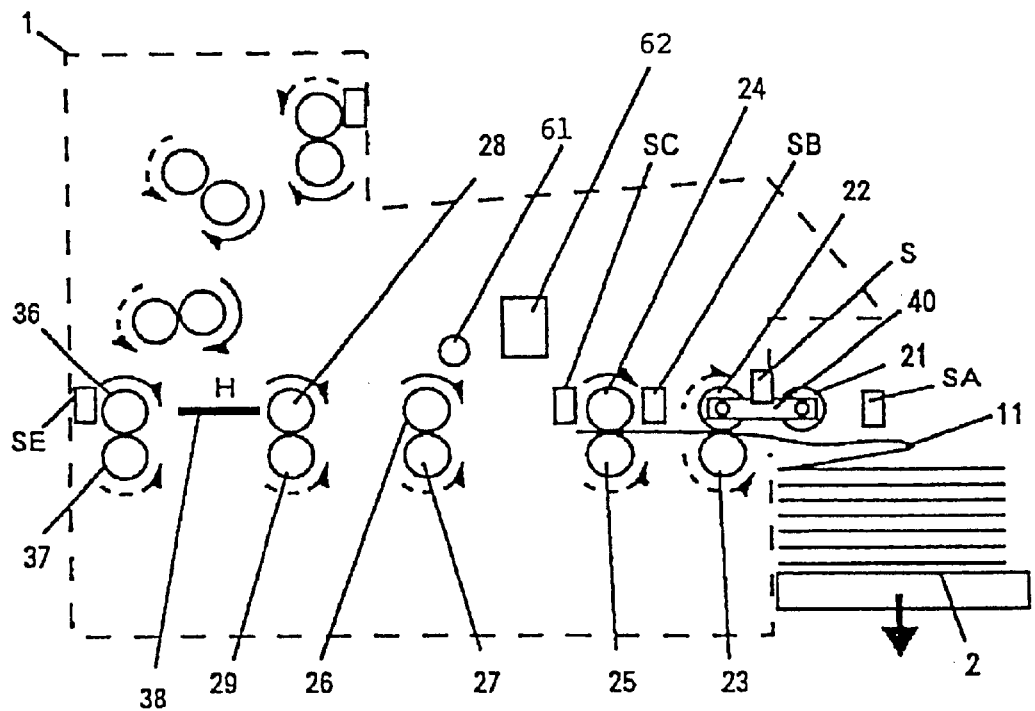
FIG. 11 illustrates an operation of the image reading apparatus.

After the document 11 starts being fed, the document feeding sensor SB detects the leading edge of the document 11 [step 57]. Then, the controller 51 inactivates the clutch CL1 after a given time, i.e. when the document 11 arrives at a given location in the apparatus [step 58], and the hopper table 2 is lowered by a predetermined distance [step 59] (refer to FIG. 11). The stacked region of the continuous documents 11 on the table 2, particularly its seamed sections between the documents, can thus be prevented from being damaged by the pick-up roller 21, document feeding roller 22 and retarding roller 23. The reading position sensor SC detects the leading edge of document 11 [step 60], and after a given time, the document 11 starts to be read out [step 61]. At this time, the controller 51 drives the image sensor 62 at the speed responsive to the slow speed of the motor 52. While reading the documents 11 continuously, the controller 51 controls the switch 64 to switch the write-in operation from the buffer 65 to buffer 66 or vice versa, sheet by sheet of documents 11. The compression circuit 68 supplies the image data of each sheet to the host computer. This read-out process is continued until the last end of the continuous documents 11.

Figure 12:
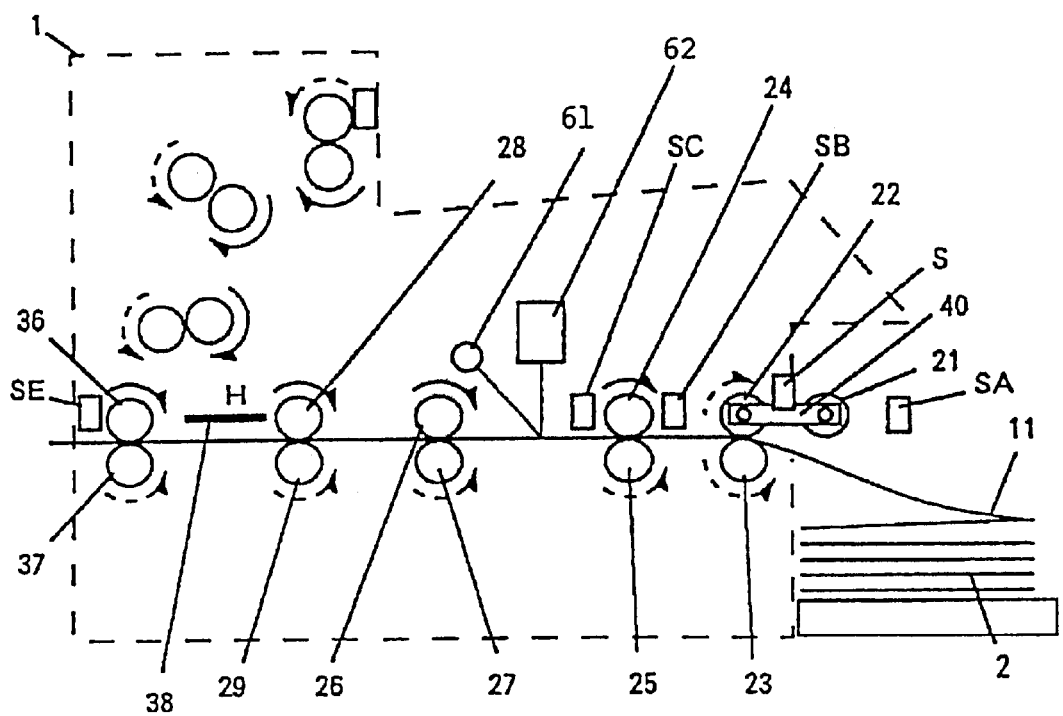
FIG. 12 illustrates an operation of the image reading apparatus.

When the controller 51 detects the ending edge of document 11 through the reading position sensor SC [step 62], the read-out process is halted after a given time [step 63]. When the document discharging sensor SE detects the ending edge [step 64], the controller 51 halts the motor 52 [step 65], and lowers the table 2 to the lowest position [step 66] (refer to FIGS. 11 and 12). On the step 59, if the table 2 is lowered to the lowest point instead of by the predetermined distance, then the controller 51 does not need to lower the table 2 further on step 66.

As such, when the continuous documents are handled, the documents start to be fed under the condition that the hopper table 2 is raised, then the table 2 is lowered. This mechanism prevents the continuous documents from being damaged.

The above embodiment proves that the present invention has the following advantage. When the continuous documents are fed until the preceding documents arrives at to a predetermined location, the document feeding table is lowered in order to provided a space between the continuous documents and the pick-up roller, thereby preventing the documents from being damaged.

The above embodiment also proves that the image reading apparatus of the present invention can handle both independent documents and continuous documents.

It is to be understood that the invention is not to be limited to the exact construction described above, but that various changes and modifications may be made without departing from the spirit of the invention as set forth in the subjoined claims that follow.

What is claimed is:

1. An image reading apparatus comprising:

a table on which documents are stacked, said table being moveable up and down;

table moving means for raising and lowering said table;

control means for controlling said table moving means responsive to a type of a document on said table;

transmission means for transmitting the document fed from said table; and detection means for detecting an arrival of the document at a predetermined location in said image reading apparatus, wherein said control means controls said table moving means so that after raising said table, said table moving means lowers said table when the document is a continuous document and said control means also controls said table moving means to lower said table in response to an output from said detection means.

2. The image reading apparatus as defined in claim 1, wherein when the document is a continuous document, said table is moveable up and down with the continuous document stacked thereon, said transmission means transmits the continuous document fed from said table, said detection means detects an arrival of the continuous document at the predetermined location in said apparatus, and said control means controls said table moving means to lower said table in response to the output from said detection means.

3. An image reading apparatus comprising:

a table on which a document is stacked;

a pick-up roller operable to send out an uppermost sheet of the document stacked on said table;

table moving means for raising said table such that the document is in contact with said pick-up roller, and for lowering said table to release the contact between the document and said pick-up roller;

document transmission means for transmitting the document sent out by said pick-up roller; and reading means for reading content of the document transmitted by said document transmission means and for outputting resultant readout as image data, wherein the document is sent out by said pick-up roller continuously, and when the document stacked on said table is in contact with said pick-up roller, said pick-up roller starts sending out the document until the sent-out document arrives at a predetermined location, then said table moving means lowers said table.

* * * * *